(12) United States Patent
Bruso et al.

(10) Patent No.: US 11,157,722 B2
(45) Date of Patent: Oct. 26, 2021

(54) SYSTEMS AND METHODS FOR FACIAL RECOGNITION IN A CAMPUS SETTING

(71) Applicants: Kelsey L Bruso, Eagan, MN (US); Carlos T Cardoso, Blue Bell, PA (US)

(72) Inventors: Kelsey L Bruso, Eagan, MN (US); Carlos T Cardoso, Blue Bell, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 16/597,892

(22) Filed: Oct. 10, 2019

(65) Prior Publication Data
US 2021/0110143 A1   Apr. 15, 2021

(51) Int. Cl.
  *H04N 5/225*  (2006.01)
  *G06K 9/00*  (2006.01)
  *G06T 7/20*  (2017.01)
  *G06K 9/62*  (2006.01)
  *H04N 7/18*  (2006.01)
  *G08B 21/02*  (2006.01)

(52) U.S. Cl.
  CPC ..... *G06K 9/00288* (2013.01); *G06K 9/00771* (2013.01); *G06K 9/00926* (2013.01); *G06K 9/6215* (2013.01); *G06T 7/20* (2013.01); *G08B 21/02* (2013.01); *H04N 7/183* (2013.01); *G06T 2207/30168* (2013.01); *G06T 2207/30196* (2013.01); *G06T 2207/30232* (2013.01)

(58) Field of Classification Search
  CPC .......... H04N 7/18; H04N 7/183; H04N 5/225; G06K 9/00288; G06K 9/00771; G06K 9/00926; G06K 9/6215; G06T 7/20; G06T 2207/30168; G06T 2207/30196; G06T 2207/30232; G08B 21/02
  USPC ........................................ 348/169, 155, 142
  See application file for complete search history.

(56) References Cited

U.S. PATENT DOCUMENTS

| | | | | |
|---|---|---|---|---|
| 9,025,024 | B2* | 5/2015 | Xu ....................... | G06K 9/2018 348/142 |
| 10,506,110 | B2* | 12/2019 | Kunieda ............ | H04N 1/00161 |
| 10,657,360 | B2* | 5/2020 | Rozploch ........... | G06K 9/00838 |
| 10,674,587 | B2* | 6/2020 | Sinitsyn ............... | G08B 13/194 |
| 2005/0063566 | A1* | 3/2005 | Beek .................... | A61B 5/1176 382/115 |
| 2020/0145623 | A1* | 5/2020 | Sadanand ............... | G06T 7/292 |

* cited by examiner

*Primary Examiner* — Trang U Tran

(57) ABSTRACT

A security system includes a camera having a field of vision. The camera sends image frames to a machine readable memory. A processor is accessible to the machine readable memory. The processor performs acts of receiving from the camera a plurality of frames; detecting an object entering the field of vision; determining whether the object is a person; tracking a moving path of the person; and performing facial recognition on the person using at least one of the plurality of frames.

8 Claims, 8 Drawing Sheets

FIG. 8

| | Persons to Watch | Recurring Persons | Seen Persons | Campus Persons | Archived Persons | Other Source |
|---|---|---|---|---|---|---|
| Persons to Watch | Not applicable | Yes | Yes | Yes | Yes | Yes |
| Recurring Persons | Yes | Not applicable | No | Yes | No | Yes |
| Seen Persons | Yes | No | Not applicable | Yes | No | Yes |
| Campus Persons | Yes | Yes | Yes | Not applicable | Yes | Yes |
| Archived Persons | Yes | No | No | Yes | Not applicable | Yes |
| Other Source | Yes | Yes | Yes | Yes | Yes | Not applicable |

If a stored image appears in the set / The stored image may also appear in the set

SYSTEMS AND METHODS FOR FACIAL RECOGNITION IN A CAMPUS SETTING

FIELD OF THE DISCLOSURE

The present invention relates generally to facial recognition in a campus setting. More particularly, the present invention includes specifically designed database structure and facial recognition methods to rapidly perform facial recognition in a campus setting.

BACKGROUND

Increasing the security of campuses is of paramount importance where unknown people entering a campus must be quickly assessed for security, e.g., classified as friend, foe, or person of interest. Many campuses are now covered with cameras for security personnel to observe the movement of people around the campus and to identify visually anything that seems out of the ordinary. An automated system is needed to assist security personnel to recognize in real-time when a person shows up on the screen and inform the security personnel that "this person doesn't belong there."

SUMMARY

One of the challenges in facial recognition is speed. Facial recognition requires a lot of computations in comparing two pictures. Some embodiments utilize the recurring nature of people being present in a campus setting—for example, university campus, corporate campus, hospital campus, or church campus—to narrow the search space. In contrast, some embodiments can identify people in a street setting, sports venue setting, airport setting, or concert venue setting may have a set of recurring people, but recurrence is a smaller subset of the population than in a campus setting. Speeding up the identification process can be particularly critical in a crisis situation to identify "friend or foe" and to identify unexpected location or action of a known person.

In some embodiments, some recurring faces are safe to the campus, e.g., the employees at the particular campus. In other embodiments, some recurring faces can be put onto a watch list and their appearance in an image feed will cause an alert for security personnel to continue to watch or to intervene. The system learns the recurrence of faces appearing in image feeds and assigns them to a default setting.

Some embodiments identify several subsets of a general population of persons to be identified using automatic facial recognition. The system moves a person into or out of a subset as it learns the person's pattern of behavior i.e., presence or absence of the person in a video or still image over time.

In one embodiment, a security system includes a camera having a field of vision. The camera sends image frames to a machine readable memory. A processor is accessible to the machine readable memory. The processor performs acts of receiving from the camera a plurality of frames; detecting an object entering the field of vision; determining whether the object is a person; tracking a moving path of the person; and performing facial recognition on the person using at least one of the plurality of frames.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

FIG. 8 shows one embodiment for membership of stored images in each set.

DETAILED DESCRIPTION

Figure 1:
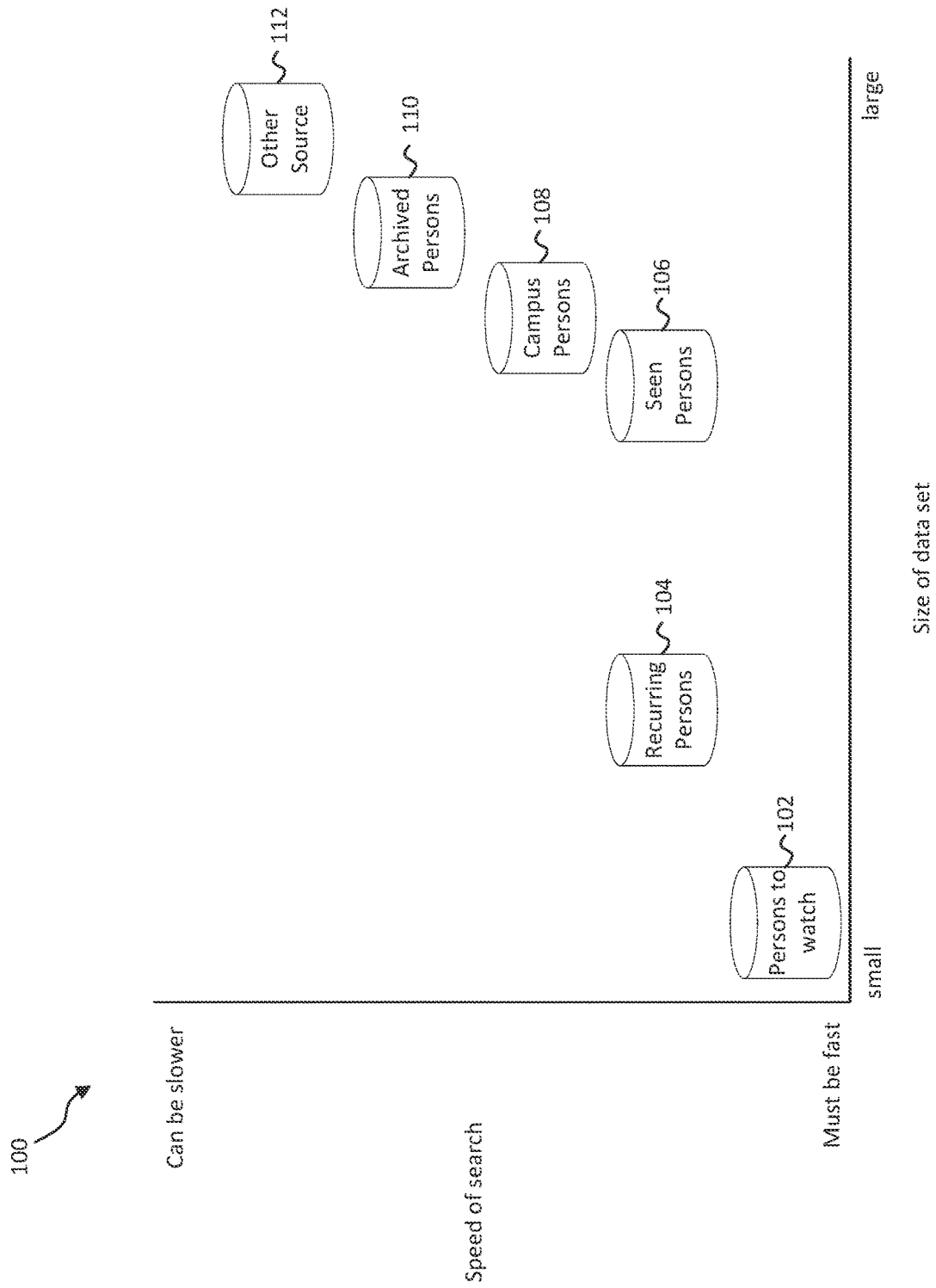
FIG. 1 is a schematic diagram of different databases with different data subjects according to one embodiment of the disclosure.

FIG. 1 is a schematic diagram of different databases with different data subjects according to one embodiment of the disclosure. There is a need to assist campus security personnel to quickly identify people who come onto campus. Systems and methods that can quickly, ideally in real time, identify a legitimate person appearing on the campus or a trespasser. The invention assumes the presence of Closed Circuit Television (CCTV) cameras whose captured images are input to the embodiments' processing.

In one embodiment, machine readable memories 102, 104, 106, 108, 110, 112 of FIG. 1 represents various partitions of a single database. In another embodiment, the machine readable memories 102, 104, 106, 108, 110, 112 are separate databases.

The machine readable memories 102, 104, 106, 108, 110, 112 store datasets representing different subsets of people. As shown in FIG. 1, machine readable memory 102 stores facial data for persons to watch; 104 for recurring persons; 106 for seen persons; 108 for campus persons; 110 for archived persons; and 112 for other persons.

The sizes of the datasets of the various machine readable memories 102, 104, 106, 108, 110, 112 is as follows: 102<104<106<108<110<112. Assuming performing a facial recognition on one person is a fix speed, then the time required to scan through machine readable memories 102, 104, 106, 108, 110, 112 is proportionate to the sizes of the datasets as follows: 102<104<106<108<110<112. Thus, the embodiments disclosed herein are different from the traditional method because the facial recognition can be performed on selected machine readable memories 102, 104, 106, 108, 110, 112 for either the fastest facial recognition, e.g., on machine readable memory 102, or the most complete recognition, e.g., on machine readable memory 112.

In an embodiment of a university campus setting, for example, a person passes through a hallway in a predictable and recurring manner, moving from one class to another according to the periodicity of the class: daily, every other day, weekly, and so on. This person is a recurring person and his facial images are stored in the machine readable memory 104 for recurring persons. Setting these Recurring Persons apart into a separate subset in the machine readable memory 104 reduces the number of faces to search i.e., it reduces the search space and makes the facial identification task faster.

Figure 2:
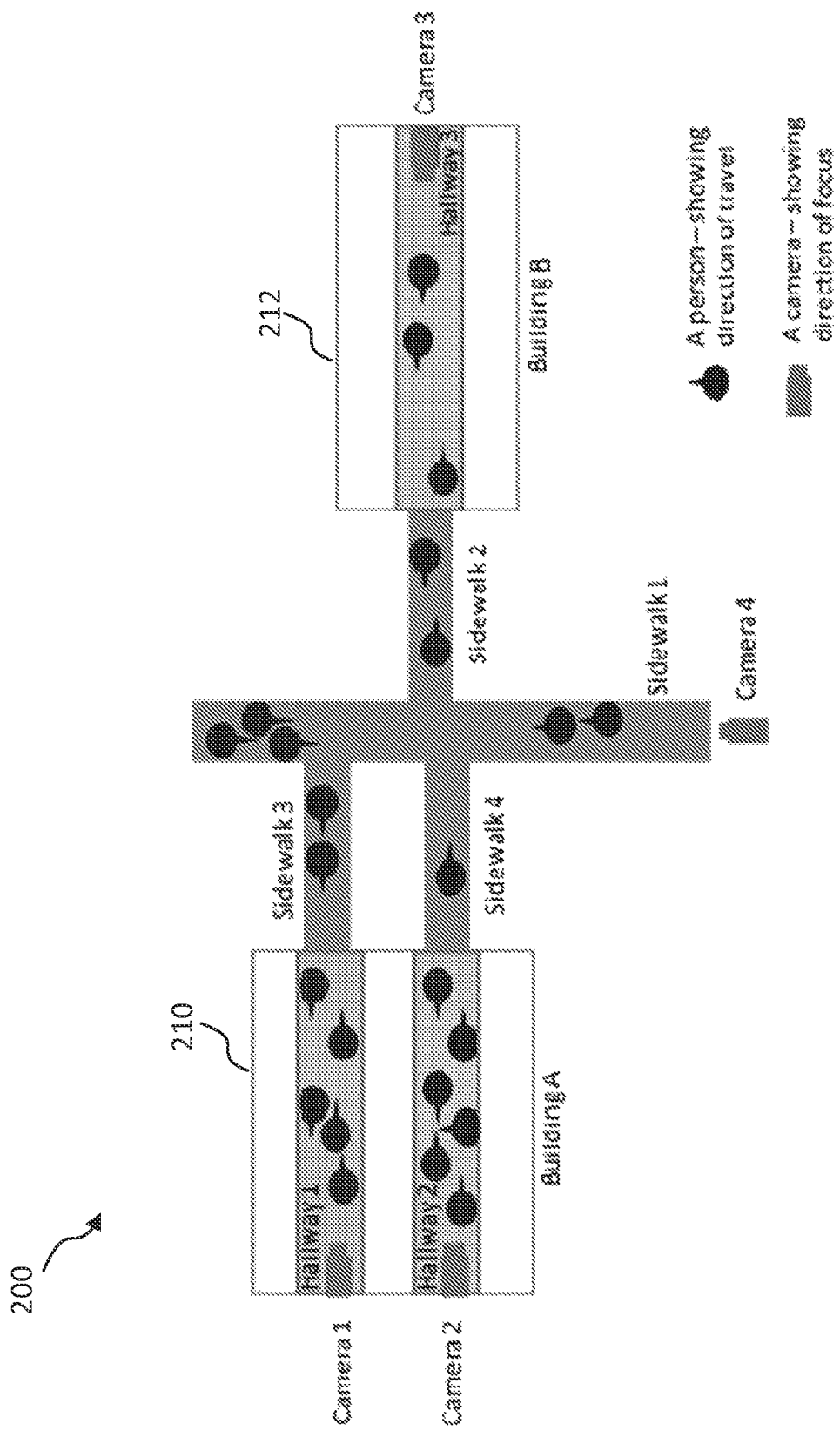
FIG. 2 is schematic figure of a campus with monitoring cameras according to one embodiment of the disclosure.

FIG. 2 is a schematic figure of a campus 200 with monitoring cameras according to one embodiment of the disclosure. It illustrates a small campus with two buildings, Building A 210 and Building B 212. Each building contains classrooms or other rooms, not shown. Building A contains Hallway 1 monitored by Camera 1 and Hallway 2 monitored by Camera 2. Building B contains Hallway 3 monitored by Camera 3. The two buildings are connected by Sidewalks 1, 2, 3, and 4 monitored by Camera 4. FIG. 2 also shows a point-in-time snapshot of persons moving on the sidewalks and through the hallways and serves to illustrate the challenge of identifying multiple persons in each frame from each camera.

In one embodiment, the camera 1 and camera 2 may be connected to a first machine readable memory that stores the recurring people in building A, e.g., the students, teacher, and/or staff that regularly appear in building A 210. The camera 3 may be connected to a second machine readable memory that stores the recurring people in building B 212. The datasets in the first machine readable memory is different from the second machine readable memory. The datasets in the first machine readable memory may or may not overlap with the second machine readable memory.

In one embodiment the camera 4 may be connected to a third machine readable memory that stores a dataset that includes all datasets of the first and second machine readable memory. This may be because both the people recurring in building A 210 and B 212 are recurring people on the sidewalks.

Figure 3:
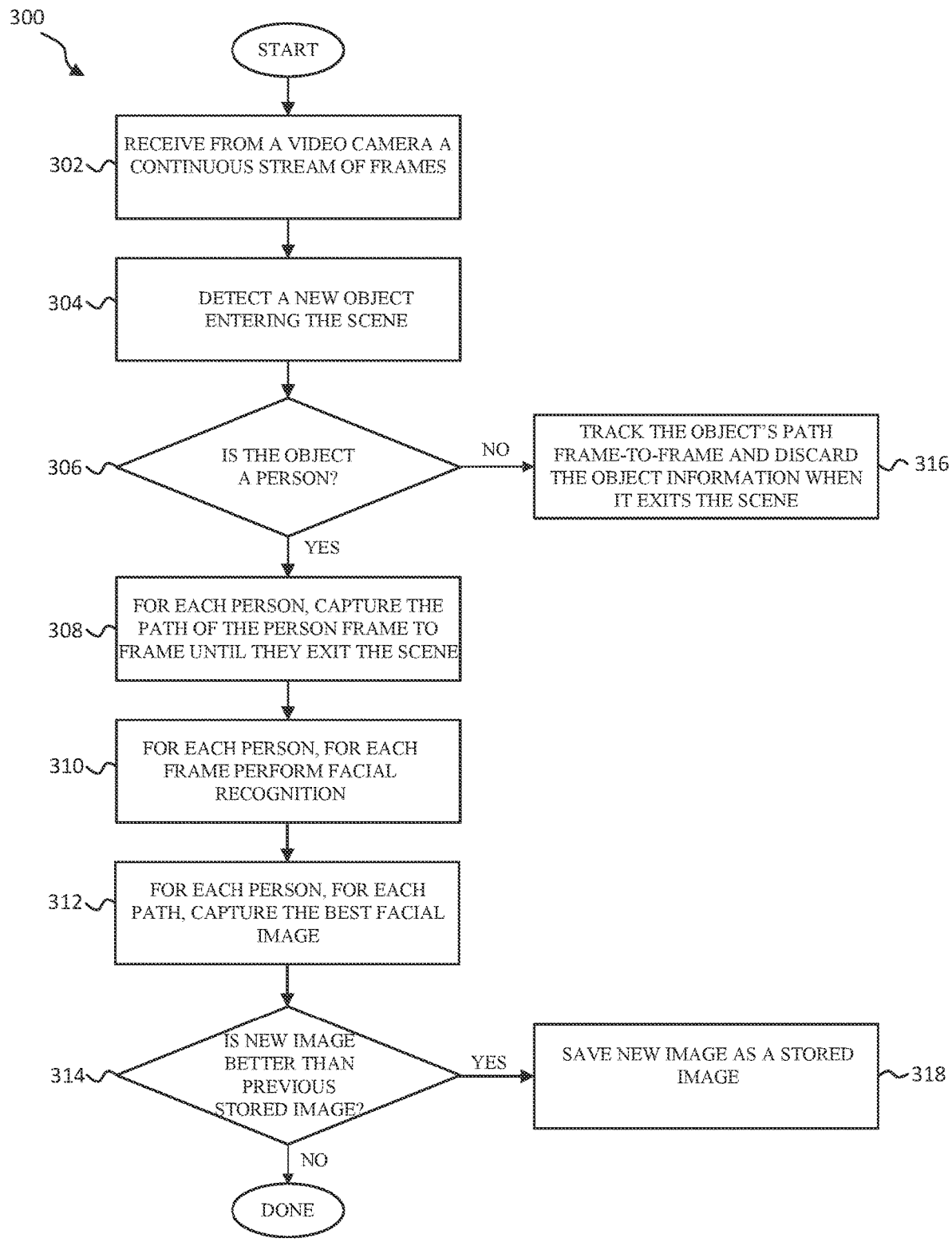
FIG. 3 is a method of facial recognition according to one embodiment of the disclosure.

FIG. 3 is a method 300 of facial recognition according to one embodiment of the disclosure. For the purpose of this disclosure, the following terms are defined.

"Nodal Points and Quality Score" means a score of the similarities of two facial images. Every face has numerous, distinguishable landmarks, the different peaks and valleys that make up facial features. Each human face has approximately 80 Nodal Points. These features include, for example, distance between the eyes, width of the nose, depth of the eye sockets, the shape of the cheekbones, and the length of the jaw line. In some embodiments, facial recognition systems use 80 points; other embodiments may use 30,000 points.

Depending on the angle of the face with respect to the camera, lighting of the face, the pixel density of the image, and other factors, some Nodal Points may be missing or undetectable. Based on these factors, an image may be assigned a Quality Score. Using the Quality Score, two images of the same face may be compared and the image with the higher Quality Score assessed as "better" than the other image.

The term "presented image" means an image of a person captured from a photo or video. This is the person we are trying to identify. The data may include the cropped JPG, GIF, or PNG of the person's face, the JPG, GIF, or PNG of the full video frame or full photo, and the set of nodal points which describe the face. Additional information may include location of the image source e.g., longitude and latitude, timestamp for when the image was created, camera identifier, camera orientation e.g., compass direction, pan, tilt, and zoom characteristics, and additional characteristics.

The term "stored image" means a previously captured image of a person. This is the image against which we compare the presented image during the facial recognition processing. In one embodiment, the stored image is a single image. In another embodiment the stored image is a set of images sorted by Quality Score. The stored image includes the attributes of the presented image plus additional information such as a system-defined identifier for the face, the timestamp of when the image was stored, the name of the person—if known, student id or employee id number, and additional characteristics.

The term "face match score" means a level of similarity between a presented image and stored image. Facial recognition relies on calculating the statistical probability that two faces are the same. When a presented image is acquired, prior art techniques are used to identify the Nodal Points. If the presented image has any "deformation" i.e., head tilt or head turned towards profile, the prior art techniques apply mathematical rotation and other adjustments to normalize the presented image to be as if the face had been captured directly facing the camera. This mathematical rotation introduces various kinds of error. The prior art techniques compare the set of Nodal Points of the presented image with one or more sets of Nodal Points of stored images and assign a probability that the two faces are the same and return the probability value between 0% (no match) and 100% (perfect match).

The term "face match threshold" means a threshold for an algorithm to say the person of the presented image is the same person as the stored image. Because the Face Match Score indicates a probability value, a user of the prior art techniques may identify a Face Match Threshold, below which they believe the technique has not identified a match and above which they believe that the technique has identified a match.

Closely related to face match score and face match threshold is the "error rate." Error rate includes "false positive" and "false negative." False positive is incorrectly matching the presented image with a stored image, i.e., wrongly identifying a presented image as matching a stored image. "False negatives" is failing to match the presented image with a stored image, even though the two images are the same person, i.e., wrongly not identifying a presented image as matching a stored image. These mismatches can be due to the issues described above regarding Nodal Points and other factors.

A "scene" is a field a vision of the camera. The "action" recorded by the camera. It is closely related to the field of view for the video camera. The embodiments assumes standard CCTV-style cameras which have limited capacity to collect image data in height, width, and depth dimensions.

Persons "enter the scene" when they are first detected by the camera and come into its field of view, and they "exit the scene" when they are last detected by the camera.

The method 300 includes act 302 receiving from a video camera a continuous stream of frames. The method includes act 304 detecting a new object entering the scene. The method includes act 306 determining whether the object is a person, if "no" method 300 goes to act 316, if "yes" method 300 goes to act 308.

At act 316, the method includes tracking the object's path frame-to-frame and discard the object information when it exits the scene. At act 308, the method includes, for each person, capturing the path of the person frame-to-frame until the person exits the scene.

The method 300 includes act 310 for each person, for each frame perform facial recognition.

The method 300 includes act 312 for each person, for each path, capturing a best facial image. The best facial image means the image taken at the closest to the front angle, the brightest lighting, and the shortest distance from the camera, etc.

The method 300 includes act 314 determining is new image better than a previously stored image, if "yes" move to 318, if "no" move to done. At act 318, the method saves new image as the stored image.

This process includes identifying the Nodal Points in each face and assigning a Quality Score to the presented image; comparing the presented image against a set of stored images, and creating a Face Match Score for the presented image and each stored image. To continuously improve the set of stored images, choose the best of the presented images from the Scene 312 and if it is better than the previous stored images i.e., it has a higher Quality Score than the other stored images, include it into the set of stored images.

Figure 4:
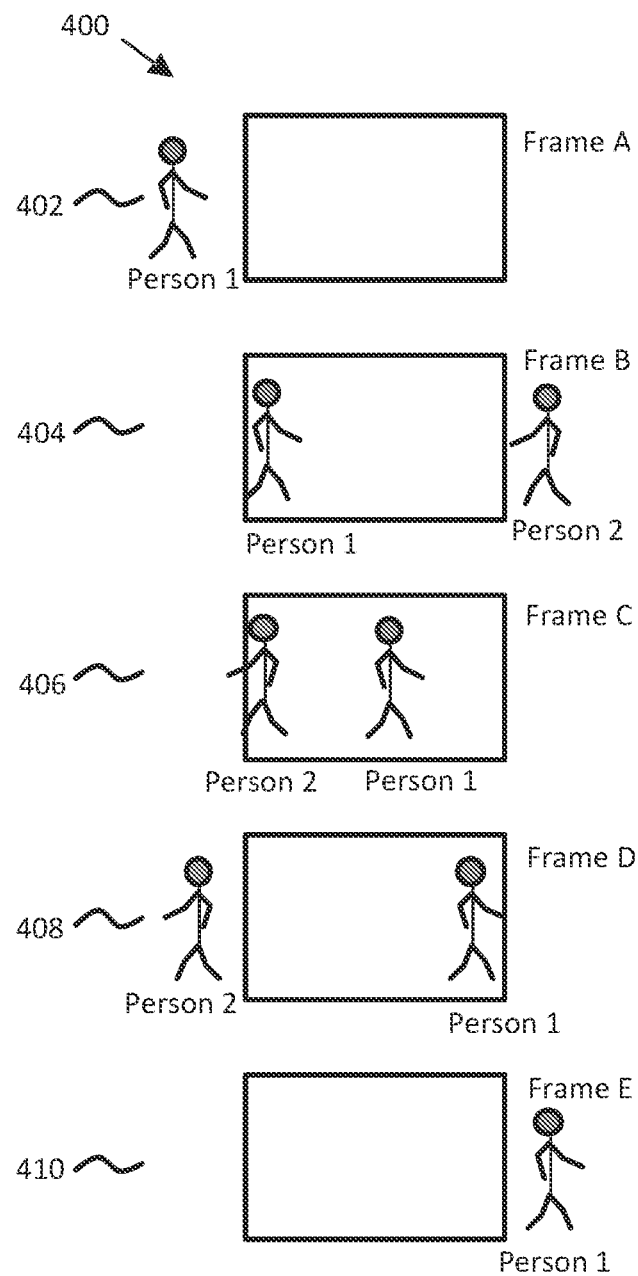
FIG. 4 is a schematic figure showing a method recognizing one or more persons in a screen according to one embodiment of the disclosure.

FIG. 4 is a schematic figure showing a method 400 recognizing one or more persons in a screen according to one embodiment of the disclosure. The method 400 may include one or more acts in method 300.

At frame A 402, person 1 has not yet entered the scene so there is no information to analyze. At frame B 404, a new object has entered the scene and starts to be tracked; it is identified as a person and is tracked as person 1, the facial image has been extracted as a presented image, and has had facial recognition performed. At Frame C 406 person 1 continues to be tracked as the same person from Frame B. At Frame C, again the facial image is extracted as a presented image, and has had facial recognition performed. At Frame C 406, a new object has entered the scene and starts to be tracked. As with person 1, the new object is identified as a person and is tracked as person 2, the facial image has been extracted and facial recognition has been performed. At Frame D 408 the same processing happens as for Frame C for person 1. At Frame D 408 the system detects that person 2 has left the scene and captures and stores data related to the track. At Frame E 410 the system detects that person 1 has left the scene and captures and stores data related to the track.

Frames A, B, C, D, and E might be sequential frames in the video or not depending on the speed (frame rate) of the video and other factors. The present invention is ambivalent as to the frame rate and depends on prior art solutions to identify and track a person between entering and exiting the scene.

Figure 5:
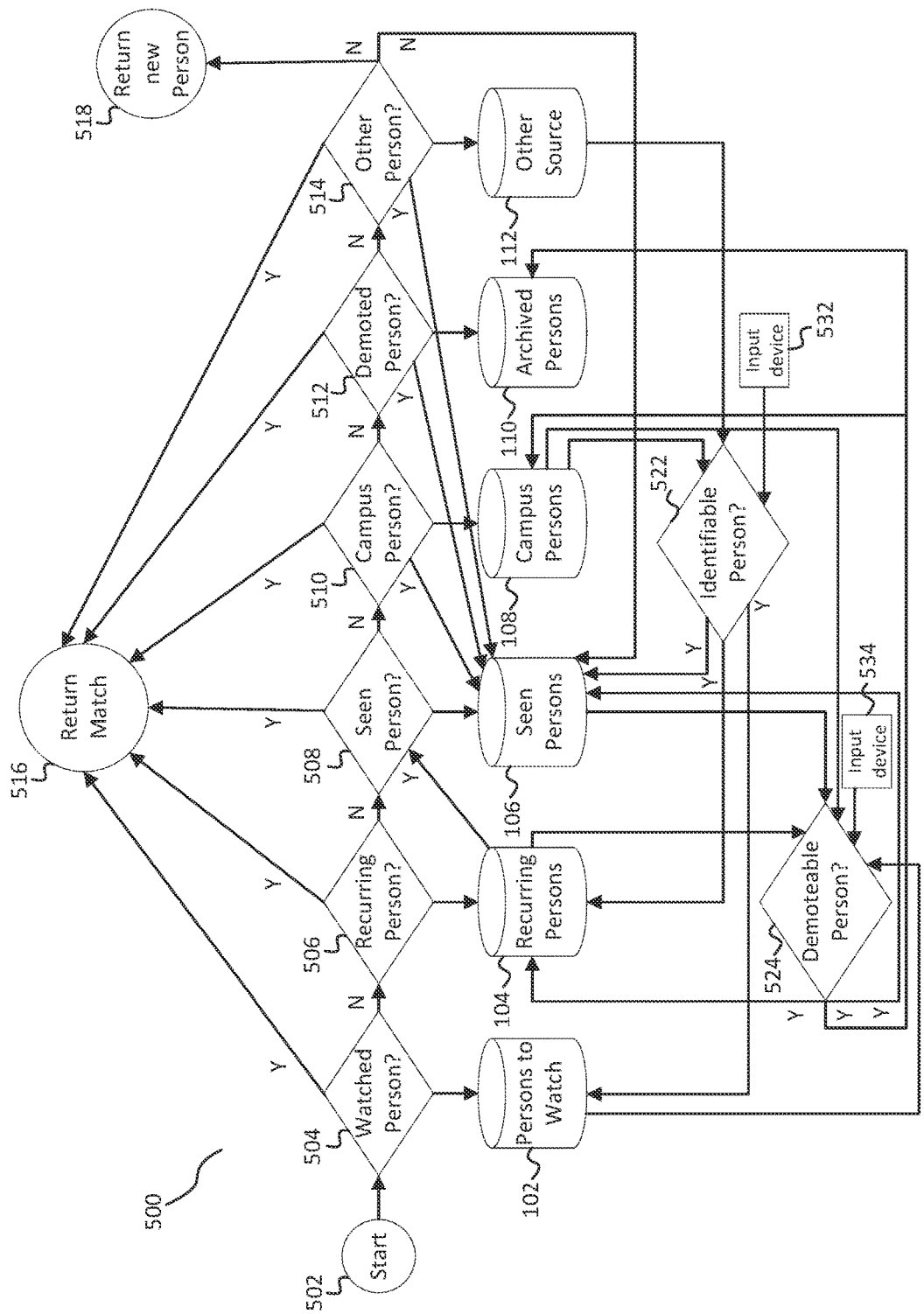
FIG. 5 is a method to perform facial recognition using one or more databases according to one embodiment of the disclosure.

FIG. 5 is a method to perform facial recognition using one or more databases according to one embodiment of the disclosure.

The invention classifies the sets of faces to achieve two goals—minimizing the size of the set i.e., the number of faces in the set, and maximizing the overall speed in searching the set. Because of the physics of non-quantum computing, there is a direct correlation between the size of a data set and the time it takes to search the set—all other things being equal. The invention provides a system to increase the speed of finding a match for a presented image by reducing the number of stored images to compare against for a match, specifically in the case where people's presence in a specific location is recurring and periodic.

In FIG. 5, the numbering of the sets matches the numbering from FIG. 1 for continuity. The set Other Source 112 can be an external or internal set of stored images, for example a department of motor vehicles set of images captured from drivers' licenses. Such sets may contain useful meta-data such as the person's name, address, relationships to other persons, and so on.

The set Archived Persons 110 gets populated from any of the sets Persons to Watch 102, Recurring Persons 104, Seen Persons 106, or Campus Persons 108. Stored images are moved from one of these sets to the set Archived Persons 110, when the image meets some criteria, for example, the person has not been seen for some user-chosen threshold time period or when an event occurs, for example the end of a school year.

The set Campus Persons 108 gets populated from an intake event such as registration for classes, hiring of a professor, or hiring of staff at which time a stored image is created as part intake process. Often a badge or identification card gets created using this stored image. The set Campus Persons 108 often contains additional meta-data such as the person's name, address, and previous history with the campus.

The set Seen Persons 106 gets populated using a presented image each time a new person is identified. The basis of the invention is the assertion that when a person is seen once in a campus setting, the person will be seen again with some, perhaps unknown, periodicity. The meta-data for the set Seen Persons 106 includes a count of the number of times this person has been seen, that is, the number of times a presented image matches a stored image in the set. In one embodiment, the meta-data also includes a timestamp for when the match occurred.

The set Recurring Persons 104 contains stored images of people who have been seen at least a user-chosen threshold number of times. If the threshold is set to two, a person moves into this set upon the second match between a presented image and a stored image in the set Seen Persons 106. If the threshold is set to five, a person moves into this set upon the fifth match between a presented image and a stored image in the set Seen Persons 106. The meta-data for the set Recurring Persons 104 includes a count of the number of times the person has been seen, that is, the number of times a presented image matches a stored image in the set Recurring Persons 104. In one embodiment, the meta-data also includes a timestamp for when the match occurred.

The set Persons to Watch 102 contains stored images of people of interest whose presence might cause an alert to be generated to security personnel for further investigation or interdiction when a presented image matches a stored image in the set Persons to Watch 102.

Quick facial recognition techniques may include storing the set in a graph database or creating indexes on the image Nodal Points to accelerate the comparison of a presented image with a set's stored images.

Depending on the requirements for processing speed, the size of the data set, and other factors, each set Persons to Watch 102, Recurring Persons 104, Seen Persons 106, Campus Persons 108, and Archived Persons 110 may be campus wide or may be partitioned according to a geographical or other partitioning of the data. At the finest granularity the set may be partitioned according to the camera from which the stored image was captured or by a time period of stored images from the camera.

The matching process begins at 502 with a presented image as input. The processing compares the presented image with images in each set of stored images. If the Face Match Score exceeds the Face match Threshold, return a match result at 516. Depending on the embodiment, the match return includes the identifier of the set in which the match was made, the name of the person, the stored image, and other meta-data.

When a match is found, the processing 516 updates the meta-data for the stored image in the set. In one embodiment it stores the presented image as another stored image for the same person. In a second embodiment, if the Face Match Score for the presented image exceeds the Face Match Score for the previous stored image, it replaces the stored image with the presented image.

When a match is found, the processing 516, depending on the embodiment, compares the current match with previous matches to determine outliers, for example, a person in a location where the person has not been seen before or a person in a location at a time different from previous matches, and so on. The detection of such an outlier might cause an alert to be generated to security personnel for further investigation or interdiction.

At 504 compare the presented image with stored images in the set Persons to watch 102. If no match is found, continue to 506.

At 506, compare the presented image with stored images in the set Recurring Persons 104. If no match is found, continue to 508.

At 508, compare the presented image with stored images in the set Seen Persons 106. If no match is found, continue to 510. If a match is found, evaluate whether the count of times matched exceeds the threshold to move the stored image to the set Recurring Persons 104. If the threshold is exceeded, insert the stored image into the set Recurring Persons 104, along with its existing and new meta-data and delete it from the set Seen Persons 106.

At 510, compare the presented image with stored images in the set Campus Persons 108. If no match is found, continue to 512. If a match is found, insert the stored image into the set Seen Persons 106, along with its existing and new meta-data.

At 512, compare the presented image with stored images in the set Archived Persons 110. If no match is found, continue to 514. If a match is found, insert the stored image into the set Seen Persons 106, along with its existing and new meta-data. Depending on the embodiment, either delete the stored image from the set Archived Persons 108 or leave it and manage the image duplication. At 514, compare the presented image with stored images in the set Other Source 112. If no match is found, store the presented image along with its meta-data in the set Seen Persons 106 and return a new person result at 518. If a match is found, store the stored image along with its meta-data in the set Seen Persons 106 and return the person as a Seen Person result at 516. In one embodiment the system does not update the set Other Source because it is an external source such as a department of motor vehicles drivers' license database.

One embodiment uses a continuously operating action to perform the analysis identifiable person 522 to search sets of images and their meta-data to enhance the set of meta-data stored in each set. The operation also supports direct input 532 of additional meta-data. A key subset of the meta-data includes the person's name, aliases, and other identifying information. In one embodiment, the processing 516 returns this subset of meta-data.

A key part of the processing is managing the contents of each data set Persons to watch 102, Recurring Persons 104, and Seen Persons 106 to keep them as small as possible. One embodiment uses a continuously operating action to perform the analysis Demoteable Person 524 to search each set for images that can be moved. The processing evaluates each stored image according to a user-chosen set of rules. If the meta-data attributes for the image match the rule, the image is moved to a different set.

FIG. 8 shows one embodiment for membership of stored images in each set. This embodiment minimizes duplication of images and their corresponding meta-data across sets. Specifically an image can appear in exactly one of the sets Recurring Persons 104, Seen Persons 106, or Archived Persons 110.

For images in the set Persons to Watch 102, a rule might be: current date greater than meta-data attribute expiration-date. If the rule matches a stored image, insert the image into Recurring Persons 104, Seen Persons 106, Campus Persons 108, or Archived Persons 110 along with its meta-data and delete the image from set Persons to watch 102.

In one embodiment moving a person from Persons to watch 102 to Campus Persons 108 involves adding the following data and meta-data to the person's information in the set Campus persons 108: person was tagged as a person of interest. The observation period started at timestamp t1. The observation period ended at timestamp t2. The person was seen at timestamp t3 by camera 1 with this captured image and action a1 was triggered; seen at timestamp t4 by camera 2 with this captured image and action a1 was triggered; seen at timestamp t5 by camera 1 with this captured image and action a2 was triggered.

For images in the set Recurring Persons 104, a rule might be: person not seen in x months. If the rule matches a stored image, insert the image into the set Seen Persons 106 along with its meta-data and delete it from the set Recurring Persons 104.

For images in the set Seen Persons 106, a rule might be: person not seen in x months. If the rule matches a stored image, insert the image into the set Archived Persons 110 along with its meta-data and delete it from the set Seen Persons 106.

In one embodiment, the set Campus Persons 108 is maintained by a different department with its own expiration rules. From the viewpoint of the invention, it is a read-only set of images. In a second embodiment, the set Campus Persons 108 is maintained by the invention processing where a rule might be: person not registered for class in the current semester. If the rule matches a stored image, insert the image into the set Archived Persons 110 along with its meta-data and delete it from the set Campus Persons 108. In a third embodiment, the images in Campus Persons 108 are refreshed periodically as employees or students age.

In one embodiment, for images in the set Archived Persons 110, a rule might be: person not seen in x years. If the rule matches a stored image, delete the image from the set. In another embodiment, images are never automatically deleted from the set Archived Persons 110. All deletions are performed manually by an administrator.

The set Other Source 112 is intended to be an external source for images. The invention treats it as a read-only set of images.

Figure 6:
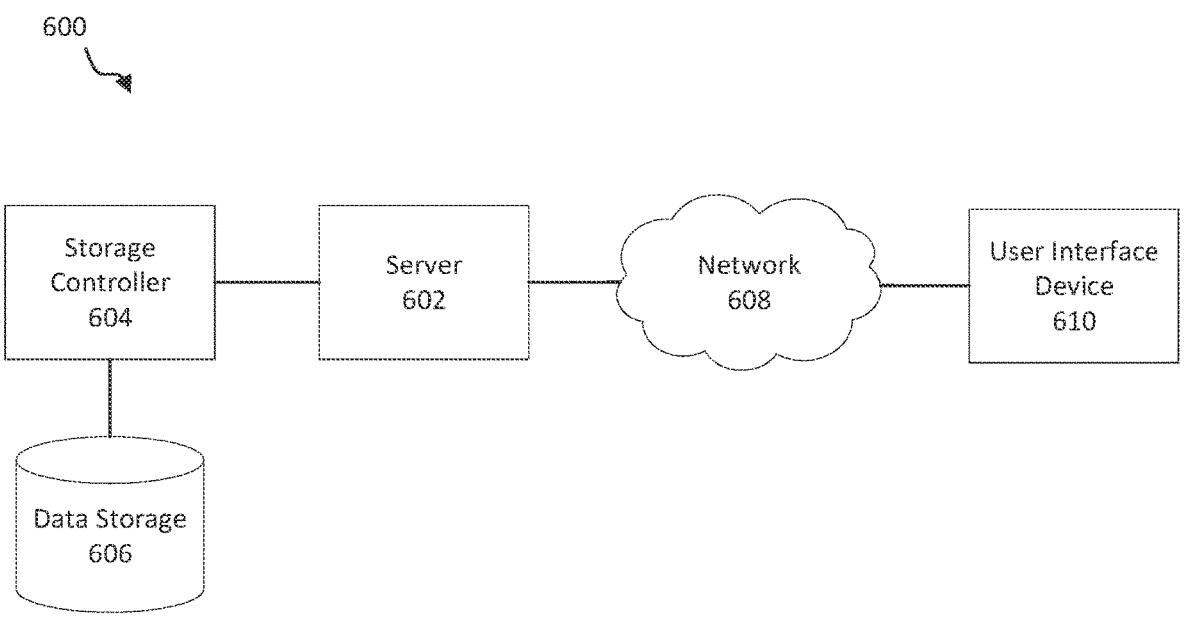
FIG. 6 is a block diagram illustrating a computer network according to one embodiment of the disclosure.

FIG. 6 illustrates a computer network 600 for obtaining access to machine readable memory files as shown in FIG. 8 and FIG. 1 in a computing system according to one embodiment of the disclosure. The system 600 may include a server 602, a data storage device 606, a network 608, and a user interface device 610. The server 602 may also be a hypervisor-based system executing one or more guest partitions hosting operating systems with modules having server configuration information. In a further embodiment, the system 600 may include a storage controller 604, or a storage server configured to manage data communications between the data storage device 606 and the server 602 or other components in communication with the network 608. In an alternative embodiment, the storage controller 604 may be coupled to the network 608.

In one embodiment, the user interface device 610 is referred to broadly and is intended to encompass a suitable processor-based device such as a desktop computer, a laptop computer, a personal digital assistant (PDA) or tablet computer, a smartphone or other mobile communication device having access to the network 608. In a further embodiment, the user interface device 610 may access the Internet or other wide area or local area network to access a web application or web service hosted by the server 602 and may provide a user interface for enabling a user to enter or receive information.

The network 608 may facilitate communications of data between the server 602 and the user interface device 610. The network 608 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 7:
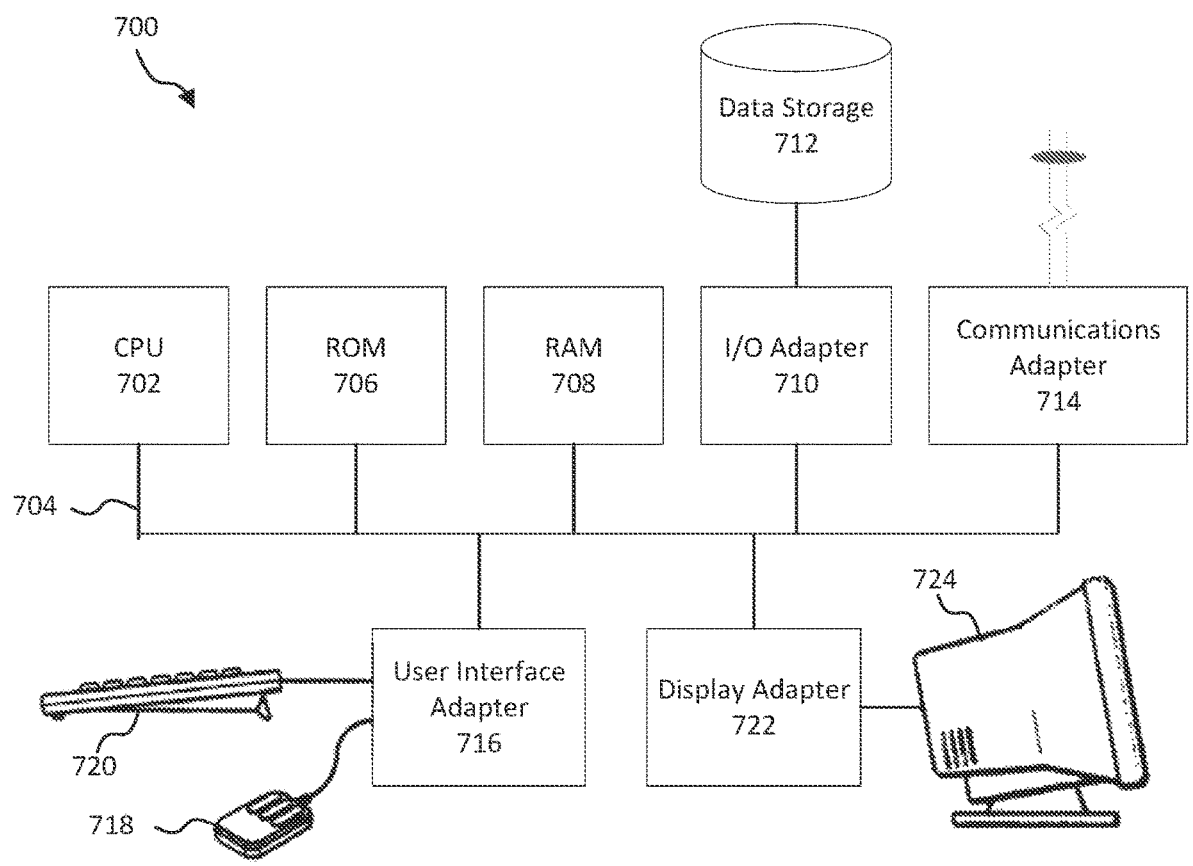
FIG. 7 is a block diagram illustrating a computer system according to one embodiment of the disclosure.

FIG. 7 illustrates a computer system 700 adapted according to certain embodiments of the server 602 and/or the user interface device 710. The central processing unit ("CPU") 702 is coupled to the system bus 704. The CPU 702 may be a general purpose CPU or microprocessor, graphics processing unit ("GPU"), and/or microcontroller. The present embodiments are not restricted by the architecture of the CPU 702 so long as the CPU 702, whether directly or indirectly, supports the operations as described herein. The CPU 702 may execute the various logical instructions according to the present embodiments.

The computer system 700 may also include random access memory (RAM) 708, which may be synchronous RAM (SRAM), dynamic RAM (DRAM), synchronous dynamic RAM (SDRAM), or the like. The computer system 700 may utilize RAM 708 to store the various data structures used by a software application. The computer system 700 may also include read only memory (ROM) 706 which may be PROM, EPROM, EEPROM, optical storage, or the like. The ROM may store configuration information for booting the computer system 700. The RAM 708 and the ROM 706 hold user and system data, and both the RAM 708 and the ROM 706 may be randomly accessed.

The computer system 700 may also include an I/O adapter 710, a communications adapter 714, a user interface adapter 716, and a display adapter 722. The I/O adapter 710 and/or the user interface adapter 716 may, in certain embodiments, enable a user to interact with the computer system 700. In a further embodiment, the display adapter 722 may display a graphical user interface (GUI) associated with a software or web-based application on a display device 824, such as a monitor or touch screen.

The I/O adapter 710 may couple one or more storage devices 712, such as one or more of a hard drive, a solid state storage device, a flash drive, a compact disc (CD) drive, a floppy disk drive, and a tape drive, to the computer system 700. According to one embodiment, the data storage 712 may be a separate server coupled to the computer system 700 through a network connection to the I/O adapter 710. The communications adapter 714 may be adapted to couple the computer system 700 to the network 608, which may be one or more of a LAN, WAN, and/or the Internet. The user interface adapter 716 couples user input devices, such as a keyboard 720, a pointing device 718, and/or a touch screen (not shown) to the computer system 700. The display adapter 722 may be driven by the CPU 702 to control the display on the display device 724. Any of the devices 702-722 may be physical and/or logical.

The applications of the present disclosure are not limited to the architecture of computer system 700. Rather the computer system 700 is provided as an example of one type of computing device that may be adapted to perform the functions of the server 602 and/or the user interface device 710. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 800 may be virtualized for access by multiple users and/or applications.

If implemented in firmware and/or software, the functions described above may be stored as one or more instructions or code on a computer-readable medium. Examples include non-volatile computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computing system, comprising
    a camera having a field of vision, the camera sending image frames to a machine readable memory;
    a processor accessible to the machine readable memory, the processor performing:
        receiving from the camera a plurality of frames;
        detecting an object entering the field of vision;
        determining whether the objects a person;
        if the object is a person, performing facial recognition on the person using at least one of the plurality of frames to determine the identification of the person;
        comparing the identification of the person to a first database of persons to watch and if the person is in the first database, generating a security alert; and
        if the person is not in the first database, comparing the identification of the person to a second database of expected persons, and if the person is not in the database of expected persons, generating a security alert;
    wherein a first size of the first database is smaller than a second size of the second database and the second size of the second database is smaller than a third size of a third database containing all persons such that the speed of the search is increased by comparing the person to a smaller database first.

2. The computing system according to claim 1, the processor further performing:
    using one of the plurality of frames as a presented image; and
    comparing a plurality of facial features of the presented image with a stored image.

3. The computing system according to claim 2, wherein the stored image is stored in a first machine readable memory that stores recurring persons.

4. The computing system according to claim 3, wherein the recurring persons are expected to be in the field of vision of the camera.

5. The computing system according to claim 2, wherein the stored image is stored in a second machine readable memory that stores watched persons.

6. The computing system according to claim 2, the processor performing
    determining whether the presented image has a resolution of facial features higher than the stored image.

7. The computing system according to claim 6, the processor performing
    replacing the stored image with the presented image.

8. The computing system according to claim 2, the processor performing
    determining whether a second image from the plurality of frames has a resolution of facial features higher than the stored image; and
    replacing the stored image with the second image.

* * * * *